US012020622B2

(12) United States Patent
Li

(10) Patent No.: US 12,020,622 B2
(45) Date of Patent: Jun. 25, 2024

(54) DISPLAY DEVICE AND DRIVING METHOD

(71) Applicant: TCL CHINA STAR OPTOELECTRONICS TECHNOLOGY CO., LTD., Guangdong (CN)

(72) Inventor: Wenfang Li, Guangdong (CN)

(73) Assignee: TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/419,458

(22) PCT Filed: May 19, 2021

(86) PCT No.: PCT/CN2021/094593
§ 371 (c)(1),
(2) Date: Jun. 29, 2021

(87) PCT Pub. No.: WO2022/236857
PCT Pub. Date: Nov. 17, 2022

(65) Prior Publication Data

US 2024/0029614 A1 Jan. 25, 2024

(30) Foreign Application Priority Data

May 11, 2021 (CN) ......................... 202110512991.1

(51) Int. Cl.
*G09G 3/20* (2006.01)

(52) U.S. Cl.
CPC ... *G09G 3/2007* (2013.01); *G09G 2320/0242* (2013.01); *G09G 2320/0626* (2013.01); *G09G 2340/00* (2013.01)

(58) Field of Classification Search
CPC ....... G09G 2340/16; G09G 2320/0252; G09G 2320/103; G09G 2320/0261;
(Continued)

(56) References Cited

U.S. PATENT DOCUMENTS 10,360,850 B2 7/2019 Yan
2005/0062703 A1 * 3/2005 Lee ...................... G09G 3/3648
345/89

(Continued)

FOREIGN PATENT DOCUMENTS

CN 107564471 A 1/2018
CN 107993616 A 5/2018

(Continued)

*Primary Examiner* — Dong Hui Liang

(57) ABSTRACT

A display device and a driving method are proposed to obtain the gray value difference data of the display device when the gray value of the display device changes. So, the display device could determine the corresponding compensation data according to the gray value difference of the display device and then the compensation data and the driving data are used to drive the display device. In this way, the driving data are compensated when the display device has a variance of gray value such that the charging operation becomes sufficient to charge the display device. For example, the charging speed becomes faster to allow the display device to reach sufficient luminance such that the issues of color shifts or insufficient luminance could be avoided.

7 Claims, 3 Drawing Sheets

(58) Field of Classification Search
CPC ... G09G 2320/0285; G09G 2320/0271; G09G 2320/0233; G09G 2320/0247; G09G 2320/0257; G09G 2320/0242; G09G 2360/16; G09G 2360/18; G09G 3/3648; G09G 3/3611; G09G 3/3233
See application file for complete search history.

(56) References Cited

U.S. PATENT DOCUMENTS

| | | | | |
|---|---|---|---|---|
| 2006/0214897 | A1* | 9/2006 | Murai | G09G 3/2011 345/89 |
| 2006/0267893 | A1* | 11/2006 | Kim | G09G 3/3611 345/89 |
| 2008/0055219 | A1* | 3/2008 | Jung | G09G 3/3648 345/89 |
| 2008/0068324 | A1* | 3/2008 | Chung | G09G 3/3648 345/98 |
| 2016/0293109 | A1 | 10/2016 | Yang | |
| 2020/0320922 | A1* | 10/2020 | Ko | G09G 3/3266 |

FOREIGN PATENT DOCUMENTS

| | | | |
|---|---|---|---|
| CN | 109036290 | A | 12/2018 |
| CN | 109584796 | A | 4/2019 |
| CN | 109584831 | A | 4/2019 |
| CN | 112216243 | A | 1/2021 |
| CN | 112581896 | A | 3/2021 |
| KR | 20060106123 | A | 10/2006 |

* cited by examiner

DISPLAY DEVICE AND DRIVING METHOD

FIELD OF THE DISCLOSURE

The present disclosure relates to a display technology, and more particularly, to a display device and a driving method.

BACKGROUND

As the progress of the display technology, the display has better and better resolution and refresh rate to raise the display effect. As the increase of the refresh rate, the charging time for charging each row of the pixels will be reduced. Taking a 4K 60 Hz display as an example, the charging time for each row of the pixels is 7.5 ms and the effective charging time is 3.8 ms. In a 4K 120 Hz display, the charging time for each row of the pixels is 3.75 ms and the effective charging time is only 1.8 ms. When the display needs to be switched from a low gray value to a high gray value, the short charging time might not be enough. Therefore, there might be issues of color shifts or insufficient luminance.

From the above, it could be understood that the conventional display have issues of color shifts or insufficient luminance because the charging time might not be enough to switch the pixels from low gray values to high gray values.

SUMMARY

One objective of an embodiment of the present disclosure is to provide a display device and a driving method for alleviate the issues of color shifts or insufficient luminance caused by insufficient charging time for switching the pixels from low gray values to high gray values.

According to an embodiment of the present disclosure, a display device, is disclosed. The display device comprises: an obtaining module, configured to determine a first display gray value and a second display gray value of the display device according to a gray value difference of the display device, wherein a display time of an image corresponding to the second display gray value is later than a display time of an image corresponding to the first display gray value; a data processing module, connected to the obtaining module, configured to determine gray value difference data of the display device according to the first display gray value and the second display gray value; a determining module, connected to the data processing module, configured to determine compensation data corresponding to the gray value difference data according to the gray value difference data of the display device and a corresponding relationship between the gray value difference data and the compensation data; and a driving module, connected to the determining module, configured to use the compensation data and driving data to drive the display device.

In some embodiments, the data processing module comprises: a first processing module, configured to determine a difference between the first display gray value and the second display gray value according to the first display gray value and the second display gray value; and a second processing module, connected to the second processing module, configured to determine the gray value difference data according to the difference between the first display gray value and the second display gray value and a predetermined gray value.

In some embodiments, the second processing module comprise: a gray value input module, configured to input the predetermined gray value; and a comparison module, connected to the gray value input module, configured to compare the difference between the first display gray value and the second display gray value with the predetermined gray value to determine the gray value difference data of the display device.

In some embodiments, the gray value input module comprises: a first gray value input module, configured to input a first reference gray value; a second gray value input module, configured to input a second reference gray value; a third gray value input module, configured to input a third reference gray value; and a fourth gray value input module, configured to input a fourth reference gray value. The predetermined gray value comprises the first reference gray value, the second reference gray value, the third reference gray value and the fourth reference gray value, the first reference gray value is greater than the second reference gray value, the second reference gray value is greater than the third reference gray value, and the third reference gray value is greater than the fourth reference gray value.

In some embodiments, the comparison module comprises: a first comparator, having a first input end connected to the first processing module and a second input end connected to the first gray value input module, wherein the first comparator is configured to compare the difference between the first display gray value and the second display gray value with the first reference gray value; a second comparator, having a first input end connected to the first processing module and a second input end connected to the second gray value input module, wherein the second comparator is configured to compare the difference between the first display gray value and the second display gray value with the second reference gray value; a third comparator, having a first input end connected to the first processing module and a second input end connected to the third gray value input module, wherein the third comparator is configured to compare the difference between the first display gray value and the second display gray value with the third reference gray value; and a fourth comparator, having a first input end connected to the first processing module and a second input end connected to the fourth gray value input module, wherein the fourth comparator is configured to compare the difference between the first display gray value and the second display gray value with the fourth reference gray value.

In some embodiments, the determining module comprises: a first determining module, connected to an output end of the first comparator, configured to determine first compensation data according to an output of the first comparator; a second determining module, connected to an output end of the second comparator, configured to determine second compensation data according to an output of the second comparator; a third determining module, connected to an output end of the third comparator, configured to determine third compensation data according to an output of the third comparator; and a fourth determining module, connected to an output end of the fourth comparator, configured to determine fourth compensation data according to an output of the fourth comparator.

In some embodiments, the comparison module comprises a comparator; the predetermined gray value comprises a first reference gray value, a second reference gray value, a third reference gray value and a fourth reference gray value; the first reference gray value is greater than the second reference gray value; the second reference gray value is greater than the third reference gray value; the third reference gray value is greater than the fourth reference gray value; a first input end of the comparator is connected to the first processing module, a second input end of the comparator is connected to the gray value input module; and the comparator is configured to orderly compare the difference between the first display gray value and the second display gray value with the first reference gray value, with the second reference gray value, with the third reference gray value and with the fourth gray value to output different comparison results.

In some embodiments, the driving module comprises: a first driving module, configured to output the driving data; a second driving module, configured to output the compensation data; and a third driving module, connected to the first driving module and the second driving module, configured to receive the driving data from the first driving module and the compensation data from the second driving module and using the driving data and the compensation data to drive the display device.

In some embodiments, the driving data are voltage data and the compensation data are current data.

According to an embodiment of the present disclosure, a method for driving a display device is disclosed. The method comprises: determining a first display gray value and a second display gray value of the display device according to a gray value difference of the display device, wherein a display time of an image corresponding to the second display gray value is later than a display time of an image corresponding to the first display gray value; determining gray value difference data of the display device according to the first display gray value and the second display gray value; determining compensation data corresponding to the gray value difference data according to the gray value difference data of the display device and a corresponding relationship between the gray value difference data and the compensation data; and using the compensation data and driving data to drive the display device.

In some embodiments, the step of determining the gray value difference data of the display device according to the first display gray value and the second display gray value comprises: determining a difference between the first display gray value and the second display gray value according to the first display gray value and the second display gray value; and determining the gray value difference data according to the difference between the first display gray value and the second display gray value and a predetermined gray value.

In some embodiments, the step of determining the gray value difference data according to the difference between the first display gray value and the second display gray value and the predetermined gray value comprises: obtaining the predetermined gray value; comparing the difference between the first display gray value and the second display gray value with the predetermined gray value to determine a comparison result; and determining the gray value difference data of the display device according to the comparison result.

In some embodiments, the step of comparing the difference between the first display gray value and the second display gray value with the predetermined gray value to determine the comparison result comprises: obtaining a first reference gray value, wherein the predetermined gray value comprises the first reference gray value; determining whether the difference between the first display gray value and the second display gray value is greater than the first reference gray value; and determining the comparison result if the difference between the first display gray value and the second display gray value is greater than the first reference gray value.

In some embodiments, the method further comprises following steps after the step of determining whether the difference between the first display gray value and the second display gray value is greater than the first reference gray value: obtaining a second reference gray value if the difference between the first display gray value and the second display gray value is smaller than or equal to the first reference gray value, wherein the second reference gray value is smaller than the first reference gray value; determining whether the difference between the first display gray value and the second display gray value is greater than the second reference gray value; and determining the comparison result if the difference between the first display gray value and the second display gray value is greater than the second reference gray value.

In some embodiments, the method further comprises following steps after the step of determining whether the difference between the first display gray value and the second display gray value is greater than the second reference gray value: obtaining a third reference gray value if the difference between the first display gray value and the second display gray value is smaller than or equal to the second reference gray value, wherein the third reference gray value is smaller than the second reference gray value; determining whether the difference between the first display gray value and the second display gray value is greater than the third reference gray value; and determining the comparison result if the difference between the first display gray value and the second display gray value is greater than the third reference gray value.

In some embodiments, the method further comprises following steps after the step of determining whether the difference between the first display gray value and the second display gray value is greater than the third reference gray value: obtaining a fourth reference gray value if the difference between the first display gray value and the second display gray value is smaller than or equal to the third reference gray value, wherein the fourth reference gray value is smaller than the third reference gray value; determining whether the difference between the first display gray value and the second display gray value is greater than the fourth reference gray value; and determining the comparison result if the difference between the first display gray value and the second display gray value is greater than the fourth reference gray value.

In some embodiments, the step of comparing the difference between the first display gray value and the second display gray value with the predetermined gray value to determine the comparison result comprises: obtaining a first reference gray value, a second reference gray value, a third reference gray value and a fourth reference gray value, wherein the predetermined gray value comprises the first reference gray value, the second reference gray value, the third reference gray value and the fourth reference gray value, the first reference gray value is greater than the second reference gray value, the second reference gray value is greater than the third reference gray value, and the third reference gray value is greater than the fourth reference gray value; respectively comparing the difference between the first display gray value and the second display gray value with the first reference gray value, with the second reference gray value, with the third reference gray value and with the fourth gray value to respectively output a first comparison result, a second comparison result, a third comparison result and a fourth comparison result accordingly; and determining the comparison result according to the first comparison result, the second comparison result, the third comparison result and the fourth comparison result.

In some embodiments, the step of determining compensation data corresponding to the gray value difference data according to the gray value difference data of the display device and the corresponding relationship between the gray value difference data and the compensation data comprises: determining first compensation data corresponding to the gray value difference data according to the first comparison result and the relationship between the gray value difference data and the compensation data; determining second compensation data corresponding to the gray value difference data according to the second comparison result and the relationship between the gray value difference data and the compensation data; determining third compensation data corresponding to the gray value difference data according to the third comparison result and the relationship between the gray value difference data and the compensation data; determining fourth compensation data corresponding to the gray value difference data according to the fourth comparison result and the relationship between the gray value difference data and the compensation data; and determining the compensation data according to the first compensation data, the second compensation data, the third compensation data and the fourth compensation data.

In some embodiments, the method further comprises following steps before the step of determining compensation data corresponding to the gray value difference data according to the gray value difference data of the display device and the corresponding relationship between the gray value difference data and the compensation data: obtaining a testing screen; determining a theoretical display gray value of the testing screen according to the testing screen; driving the display device to determine an actual gray value of the testing screen; and determining the corresponding relationship between the gray value difference data and compensation data according to the actual gray value of the testing screen and the theoretical display gray value of the testing screen.

In some embodiments, the step of using the compensation data and driving data to drive the display device comprises: obtaining the driving data corresponding to the second display gray value of the display device; obtaining the compensation data corresponding to the second display gray value of the display device; driving the display device according to the driving data and the compensation data.

The present disclosure provides a display device and a driving method. a display device, is disclosed. The display device includes an obtaining module, a data processing module, a determining module, and a driving module. The obtaining module determines a first display gray value and a second display gray value of the display device according to a gray value difference of the display device. The data processing module determines gray value difference data of the display device according to the first display gray value and the second display gray value. The determining module determines compensation data corresponding to the gray value difference data according to the gray value difference data of the display device and a corresponding relationship between the gray value difference data and the compensation data. The driving module uses the compensation data and driving data to drive the display device. The present disclosure obtains the gray value difference data of the display device when the gray value of the display device changes. So, the display device could determine the corresponding compensation data according to the gray value difference of the display device and then the compensation data and the driving data are used to drive the display device. In this way, the driving data are compensated when the display device has a variance of gray value such that the charging operation becomes sufficient to charge the display device. For example, the charging speed becomes faster to allow the display device to reach sufficient luminance such that the issues of color shifts or insufficient luminance could be avoided.

BRIEF DESCRIPTION OF THE DRAWINGS

To describe the technical solutions in the embodiments of this application more clearly, the following briefly introduces the accompanying drawings required for describing the embodiments. Apparently, the accompanying drawings in the following description show merely some embodiments of this application, and a person of ordinary skill in the art may still derive other drawings from these accompanying drawings without creative efforts.

DETAILED DESCRIPTION

To help a person skilled in the art better understand the solutions of the present disclosure, the following clearly and completely describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present disclosure.

Figure 1:
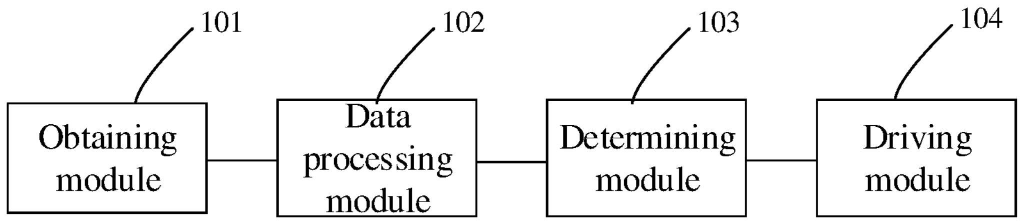
FIG. 1 is a diagram of a display device according to a first embodiment of the present disclosure.

Please refer to FIG. 1. FIG. 1 is a diagram of a display device according to a first embodiment of the present disclosure. As shown in FIG. 1, a display device is disclosed. The display device comprises: an obtaining module 101, a data processing module 102, a determining module 103, and a driving module 104.

The obtaining module 101 is configured to determine a first display gray value and a second display gray value of the display device according to a gray value difference of the display device, wherein a display time of an image corresponding to the second display gray value is later than a display time of an image corresponding to the first display gray value.

The data processing module 102 is connected to the obtaining module 101 and is configured to determine gray value difference data of the display device according to the first display gray value and the second display gray value.

The determining module 103 is connected to the data processing module 102 and is configured to determine compensation data corresponding to the gray value difference data according to the gray value difference data of the display device and a corresponding relationship between the gray value difference data and the compensation data.

The driving module 104 is connected to the determining module 103 and is configured to use the compensation data and driving data to drive the display device.

According to an embodiment, a display device is provided. The display device could obtain the gray value difference data of the display device when the gray value of the display device changes. So, the display device could determine the corresponding compensation data according to the gray value difference of the display device and then the compensation data and the driving data are used to drive the display device. In this way, the driving data are compensated when the display device has a variance of gray value such that the charging operation becomes sufficient to charge the display device. For example, the charging speed becomes faster to allow the display device to reach sufficient luminance such that the issues of color shifts or insufficient luminance could be avoided.

Figure 2:
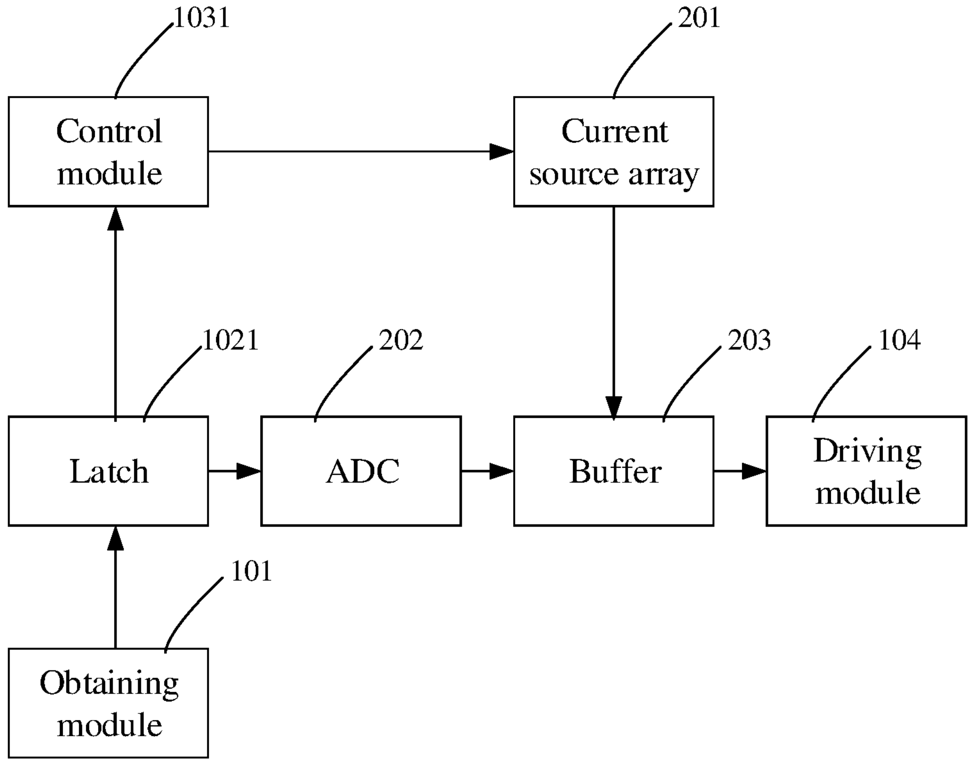
FIG. 2 is a diagram of a display device according to a second embodiment of the present disclosure.
Figure 3:
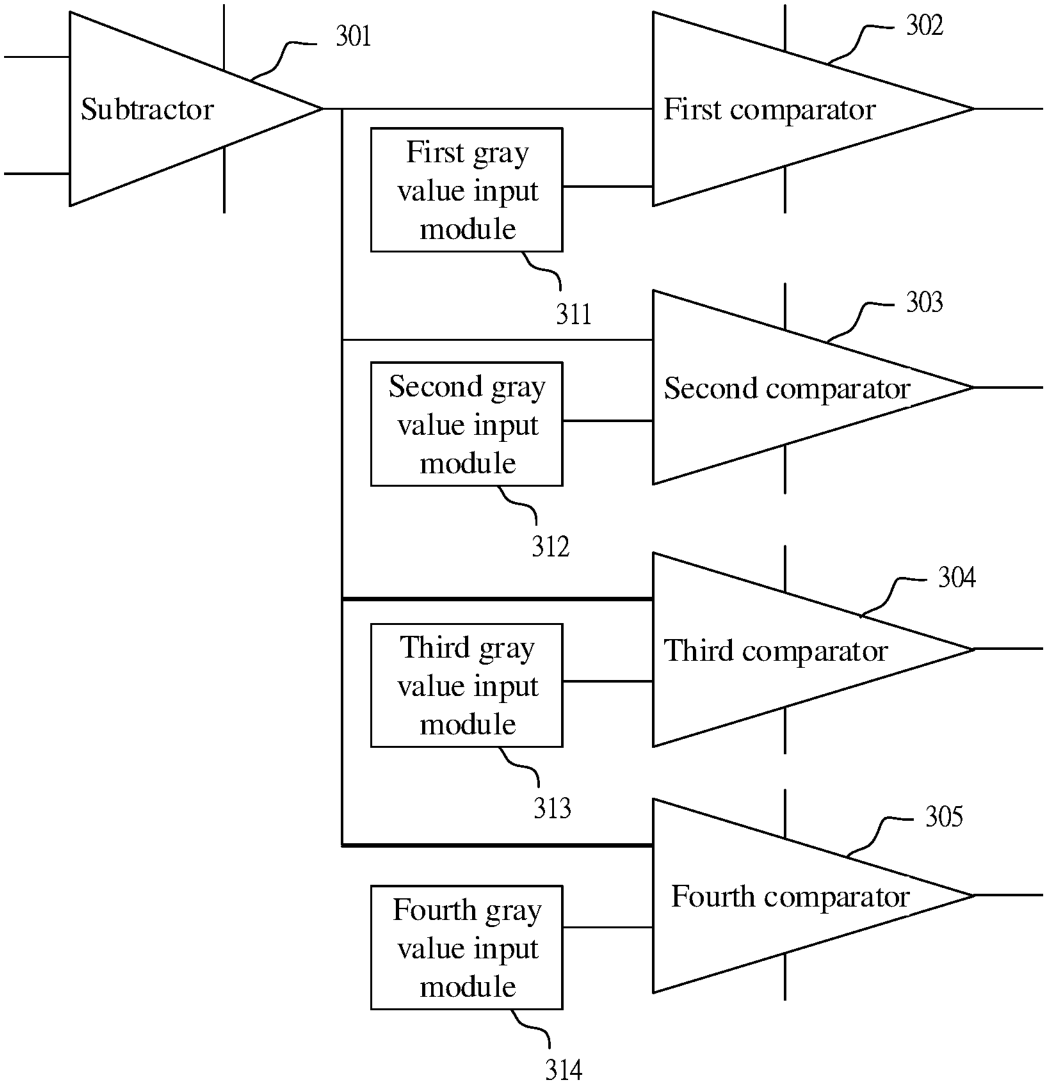
FIG. 3 is diagram of a data processing module of the display device according to an embodiment of the present disclosure.

Please refer to FIG. 2. FIG. 2 is a diagram of a display device according to a second embodiment of the present disclosure. As shown in FIG. 2, when the gray value of the display device changes, the obtaining module 101 receives the gray value difference of the display device and determines the first display gray value and the second display gray value according to the gray value difference of the display device. Then, the obtaining module 101 sends the first display gray value and the second display gray value to the data processing module. The data processing module comprises a latch 1021. The latch 1021 processes the data and determines the gray value difference data of the display device. Then, the latch 1021 sends the second display gray value to the digital to analog converter (ADC) 202 and sends the gray value difference data to the determining module. The control module 1031 of the determining module determines the corresponding compensation data according to the gray value difference data and controls the current source array 201 to output the corresponding compensation data. The buffer 203 receives the driving data from the ADC 202 and the compensation data from the current source array 201 and then transfers the driving data and the compensation data to the driving module 104. The driving module 104 drives the display device.

In order to deal with different gray value difference of the display device and different degrees of insufficient charging time of the display device, in an embodiment, the data processing module comprises: a first processing module and a second processing module.

The first processing module is configured to determine a difference between the first display gray value and the second display gray value according to the first display gray value and the second display gray value.

The second processing module is connected to the second processing module and is configured to determine the gray value difference data according to the difference between the first display gray value and the second display gray value and a predetermined gray value.

The first processing module determines the difference between the first display gray value and the second display gray value. Then, the gray value gray value difference data are determined according to the difference between the first display gray value and the second display gray value and the predetermined gray value. For example, the gray value difference data comprises the gray value difference degree of the display device. According to the gray value difference degree, the display device could be compensated accordingly such that different compensation data could be provided according to different gray value differences. In this way, the display device could always be sufficiently charged no matter how much the gray value difference is and thus the display device could work normally.

In an embodiment, the second processing module comprises: a gray value input module and a comparison module.

The gray value input module is configured to input the predetermined gray value.

The comparison module is connected to the gray value input module and is configured to compare the difference between the first display gray value and the second display gray value with the predetermined gray value to determine the gray value difference data of the display device.

When the second processing module determines the gray value difference data of the display device, the gray value input module could input the predetermined gray value. Then, the comparison module compares the difference between the first display gray value and the second display gray value with the predetermined gray value to determine the gray value difference data. Taking the predetermined gray value comprises 1, 2, 3, . . . , 255 as an example, the gray value difference of the display device might be gray value 1 or gray value 2, gray value 3, . . . , or gray value 255, which could respectively correspond to different compensation. For example, each of the gray value difference corresponds to one compensation value. In this way, each gray value difference could have corresponding compensation such that the display device could be sufficiently charged to avoid the above-mentioned insufficient luminance or color shift problems.

When the gray value difference of the display device is within a certain range, the insufficient charging degree of the display device is uniform or similar. In an embodiment, the gray value input module comprises: a first gray value input module, a second gray value input module, a third gray value input module and a fourth gray value input module.

The first gray value input module is configured to input a first reference gray value. The second gray value input module is configured to input a second reference gray value. The third gray value input module is configured to input a third reference gray value. The fourth gray value input module is configured to input a fourth reference gray value. Here, the predetermined gray value comprises the first reference gray value, the second reference gray value, the third reference gray value and the fourth reference gray value, the first reference gray value is greater than the second reference gray value, the second reference gray value is greater than the third reference gray value, and the third reference gray value is greater than the fourth reference gray value.

In this embodiment, the first gray value input module, the second gray value input module, the third gray value input module and the fourth gray value input module are used to input the first reference gray value, the second reference gray value, the third reference gray value and the fourth reference gray value such that the gray value difference of the display device could be divided into different degrees according to the first reference gray value, the second reference gray value, the third reference gray value and the fourth reference gray value. In this way, the display device is compensated according to different degrees to avoid the above-mentioned insufficient luminance or color shift problems. Furthermore, the data processing load could be reduced because only a certain number of degrees are defined.

Because the display has different difference degrees, the gray value difference data of the display device needs to be determined. In an embodiment, the comparison module comprises a first comparator 302, a second comparator 303, a third comparator 304 and a fourth comparator 305.

The first comparator 302 has a first input end connected to the first processing module and a second input end connected to the first gray value input module 311. The first comparator 302 is configured to compare the difference between the first display gray value and the second display gray value with the first reference gray value.

The second comparator 303 has a first input end connected to the first processing module and a second input end connected to the second gray value input module 312. The second comparator 303 is configured to compare the difference between the first display gray value and the second display gray value with the second reference gray value.

The third comparator 304 has a first input end connected to the first processing module and a second input end connected to the third gray value input module 313. The third comparator 304 is configured to compare the difference between the first display gray value and the second display gray value with the third reference gray value.

The fourth comparator 305 has a first input end connected to the first processing module and a second input end connected to the fourth gray value input module 314. The fourth comparator 305 is configured to compare the difference between the first display gray value and the second display gray value with the fourth reference gray value.

After the difference between the first display gray value and the second display gray value is determined, the difference between the first display gray value and the second display gray value is determined is inputted into the first input ends of the first comparator, the second comparator, the third comparator and the fourth comparator. Furthermore, the second input ends of the first comparator, the second comparator, the third comparator and the fourth comparator are respectively connected to the first gray value input module, the second gray value input module, the third gray value input module and the fourth gray value input module. In this way, the difference between the first display gray value and the second display gray value could be simultaneously compared with the first reference gray value, the second reference gray value, the third reference gray value and the fourth reference gray value. In this way, the gray value difference of the display device could be determined to be in a certain interval (degree). That is, the degree of the gray value difference could be determined and the display device could be compensated accordingly such that the display device could be sufficiently charged to avoid the color shift problem.

In an embodiment, the first processing module comprises a subtractor 301. The first input end of the subtractor 301 receives the second display gray value and the second input end of the subtractor 301 receives the first display gray value. In this way, the difference between two adjacent display images could be determined by the subtractor 301. For example, the difference between the first display gray value and the second display gray value could be determined by the subtractor 301.

Specifically, the difference between the first display gray value and the second display gray value is a positive value for the following comparison. Surely, the difference between the first display gray value and the second display gray value could also be a negative value and the absolute value of the negative value could be then determined for the following comparison.

After the gray value difference of the display device is determined, different compensation data could be outputted according to different comparison results such that the whole compensation data could be determined according to the different compensation data to compensate the display device. In an embodiment, the determining module comprises a first determining module, a second determining module, a third determining module and a fourth determining module.

The first determining module is connected to an output end of the first comparator and is configured to determine first compensation data according to an output of the first comparator.

The second determining module is connected to an output end of the second comparator and is configured to determine second compensation data according to an output of the second comparator.

The third determining module is connected to an output end of the third comparator and is configured to determine third compensation data according to an output of the third comparator.

The fourth determining module is connected to an output end of the fourth comparator and is configured to determine fourth compensation data according to an output of the fourth comparator.

The compensation data comprise the first compensation data, the second compensation data, the third compensation data and the fourth compensation data. When the first comparator, the second comparator, the third comparator and the fourth comparator respectively compare the difference between the first display gray value and the second display gray value with the first reference gray value, the second reference gray value, the third reference gray value and the fourth reference gray value, the first determining module, the second determining module, the third determining module and the fourth determining module could respectively output the first compensation data, the second compensation data, the third compensation data and the fourth compensation data according to the comparison results of the first comparator, the second comparator, the third comparator and the fourth comparator such that the compensation data could be obtained according to the first compensation data, the second compensation data, the third compensation data and the fourth compensation data.

Specifically, for example, the difference between the first display gray value and the second display gray value is smaller than the fourth reference gray value. In this case, the comparison results of the first comparator, the second comparator, the third comparator and the fourth comparator all indicate that the difference between the first display gray value and the second display gray value is smaller. Then, the first determining module, the second determining module, the third determining module and the fourth determining module are all corresponding to a low voltage level or a low current level, which means that the gray value difference is smaller. This also means that the charging issue is smaller or none. Therefore, there could be smaller compensation or no compensation.

When the difference between the first display gray value and the second display gray value is greater than the fourth reference gray value but is smaller than the third reference gray value, the comparison results of the first comparator, the second comparator and the third comparator indicate that the difference between the first display gray value and the second display gray value is smaller but the comparison result of the fourth comparator indicates that the fourth reference gray value is smaller. In this case, the first determining module, the second determining module and the third determining module correspond to a low voltage level or a low current level but the fourth determining module corresponds to a high voltage level or a high current level. Then, the first compensation data, the second compensation data, the third compensation data and the fourth compensation data could be accumulated to compensate the display device such that the compensation data could allow the display device to be sufficiently charged without being overcharged.

When the difference between the first display gray value and the second display gray value is greater than the third reference gray value but is smaller than the second reference gray value, the comparison results of the first comparator and the second comparator indicate that the difference between the first display gray value and the second display gray value is smaller but the comparison results of the third comparator and the fourth comparator indicate that the third reference gray value and the fourth reference gray value are smaller. In this case, the first determining module and the second determining module correspond to a low voltage level or a low current level but the third determining module and the fourth determining module correspond to a high voltage level or a high current level. Then, the first compensation data, the second compensation data, the third compensation data and the fourth compensation data could be accumulated to compensate the display device such that the compensation data could allow the display device to be sufficiently charged without being overcharged.

When the difference between the first display gray value and the second display gray value is greater than the second reference gray value but is smaller than the first reference gray value, the comparison result of the first comparator indicates that the difference between the first display gray value and the second display gray value is smaller but the comparison results of the second comparator, the third comparator and the fourth comparator indicate that the second reference gray value, the third reference gray value and the fourth reference gray value are smaller. In this case, the first determining module corresponds to a low voltage level or a low current level but the second determining module, the third determining module and the fourth determining module correspond to a high voltage level or a high current level. Then, the first compensation data, the second compensation data, the third compensation data and the fourth compensation data could be accumulated to compensate the display device such that the compensation data could allow the display device to be sufficiently charged without being overcharged.

When the difference between the first display gray value and the second display gray value is greater than the first reference gray value, the comparison results of the first comparator, the second comparator, the third comparator and the fourth comparator indicate that the first reference gray value, the second reference gray value, the third reference gray value and the fourth reference gray value are smaller. In this case, the first determining module, the second determining module, the third determining module and the fourth determining module correspond to a high voltage level or a high current level. Then, the first compensation data, the second compensation data, the third compensation data and the fourth compensation data could be accumulated to compensate the display device such that the compensation data could allow the display device to be sufficiently charged without being overcharged.

In an embodiment, the first reference gray value is 200, the second reference gray value is 150, the third reference gray value is 100, and the fourth reference gray value is 50.

In an embodiment, the first compensation data, the second compensation data, the third compensation data and the fourth compensation data correspond to the same high voltage level or the same high current level. Or, the first compensation data, the second compensation data, the third compensation data and the fourth compensation data could correspond to the same low voltage level or the same low current level. That is, when the first compensation data, the second compensation data, the third compensation data and the fourth compensation data all correspond to the same high voltage (current) level or the same low voltage (current) level, this means that the compensation data of adjacent degrees are the same. However, this is not the limitation of the present disclosure. In the actual implementation, the compensation data of different degrees could be different. For example, the compensation data corresponding to the interval between the gray value 100 and the gray value 150 could be different from the compensation data corresponding to the interval between the gray value 150 and the gray value 200. That is, the first compensation data, the second compensation data, the third compensation data and the fourth compensation data correspond to different high voltage levels or different high current levels. Or, the first compensation data, the second compensation data, the third compensation data and the fourth compensation data correspond to different low voltage levels or different low current levels.

The comparison between the difference between the first display gray value and the second display gray value and each of the reference values is comparatively complicated. In an embodiment, the comparison module comprises a comparator. The predetermined gray value comprises a first reference gray value, a second reference gray value, a third reference gray value and a fourth reference gray value. The first reference gray value is greater than the second reference gray value. The second reference gray value is greater than the third reference gray value. The third reference gray value is greater than the fourth reference gray value. The first input end of the comparator is connected to the first processing module and a second input end of the comparator is connected to the gray value input module. The comparator is configured to orderly compare the difference between the first display gray value and the second display gray value with the first reference gray value, with the second reference gray value, with the third reference gray value and with the fourth gray value to output different comparison results.

Through orderly comparing the difference between the first display gray value and the second display gray value with the first reference gray value, with the second reference gray value, with the third reference gray value and with the fourth gray value, it is possible that a comparison result is outputted after comparing the difference between the first display gray value and the second display gray value with the first reference gray value without doing more comparisons such that the display device could output a corresponding voltage according to the comparison result.

In an embodiment, the current source array comprises a first current source, a second current source, a third current source, a fourth current source and a fifth current source. The first current source is configured to output a first current. The second current source is configured to output a second current. The third current source is configured to output a third current. The fourth current source is configured to output a fourth current. The fifth current source is configured to output a fifth current. Accordingly, when the gray value difference is within a specific interval, a corresponding current source (or multiple current sources) is used to output a current to raise the charging speed. In this way, the display device could be sufficiently charged without increasing the charging time to avoid insufficient charging or color shifts.

In an embodiment, the driving module comprises: a first driving module, a second driving module and a third driving module.

The first driving module is configured to output the driving data.

The second driving module is configured to output the compensation data.

The third driving module is connected to the first driving module and the second driving module. The third driving module is configured to receive the driving data from the first driving module and the compensation data from the second driving module and using the driving data and the compensation data to drive the display device. When the display device is being driven, the display device uses the first driving module to output the driving data. At this time, there might be the issue of insufficient charging. Therefore, the second driving module is further used to output the compensation data such that the third driving module drives the display device according to the driving data and the compensation data to avoid the issue of insufficient charging.

Here, the driving data are voltage data and the compensation data are current data. Through increasing the current value, the charging speed is increased to avoid the issue of insufficient charging.

In the above embodiments, the gray value difference 1-255 is divided into five different difference degrees. However, this is not a limitation of the present disclosure. The gray value difference could be divided into more difference degrees, such as 10 gray value difference degrees.

Figure 4:
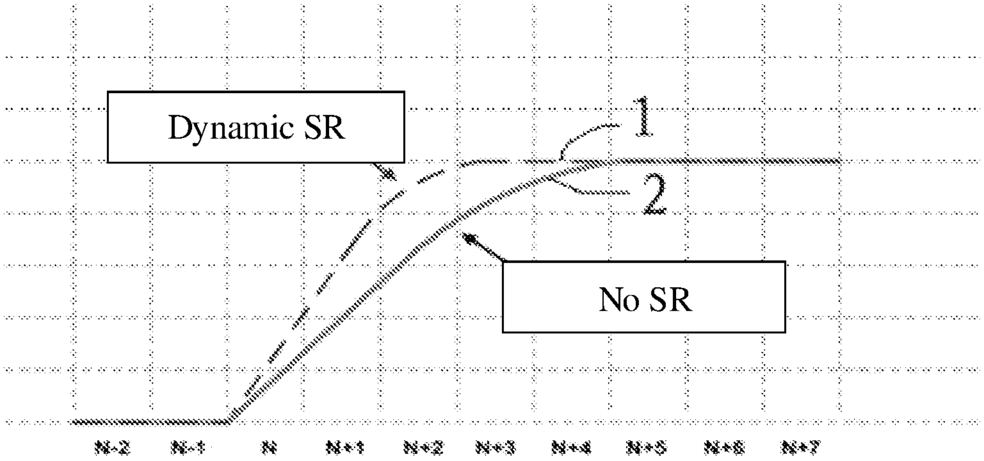
FIG. 4 is a diagram showing a curve of the gray values changed by time of the display device according to an embodiment of the present disclosure.

Please refer to FIG. 4, FIG. 4 is a diagram showing a curve of the gray values changed by time of the display device according to an embodiment of the present disclosure. As shown in FIG. 4, the horizontal axis represents the time, and the vertical axis represents the gray value. Taking the time from N−2 to N+7 as an example, the curve 1 is a gray value difference curve changed by time of a compensated display device. The curve 2 is a gray value difference curve changed by time of a display device before compensation. Here, the "no SR" indicates that there is no compensation in curve 2. The "dynamic SR" indicates that there is a compensation based on the gray value difference in the curve 1. From FIG. 4, it can be seen that, during the same time period, the gray value increasing rate of the compensated display device is greater. This allows the display device to be sufficiently charged to avoid the issues of insufficient charging and color shifts.

Figure 5:
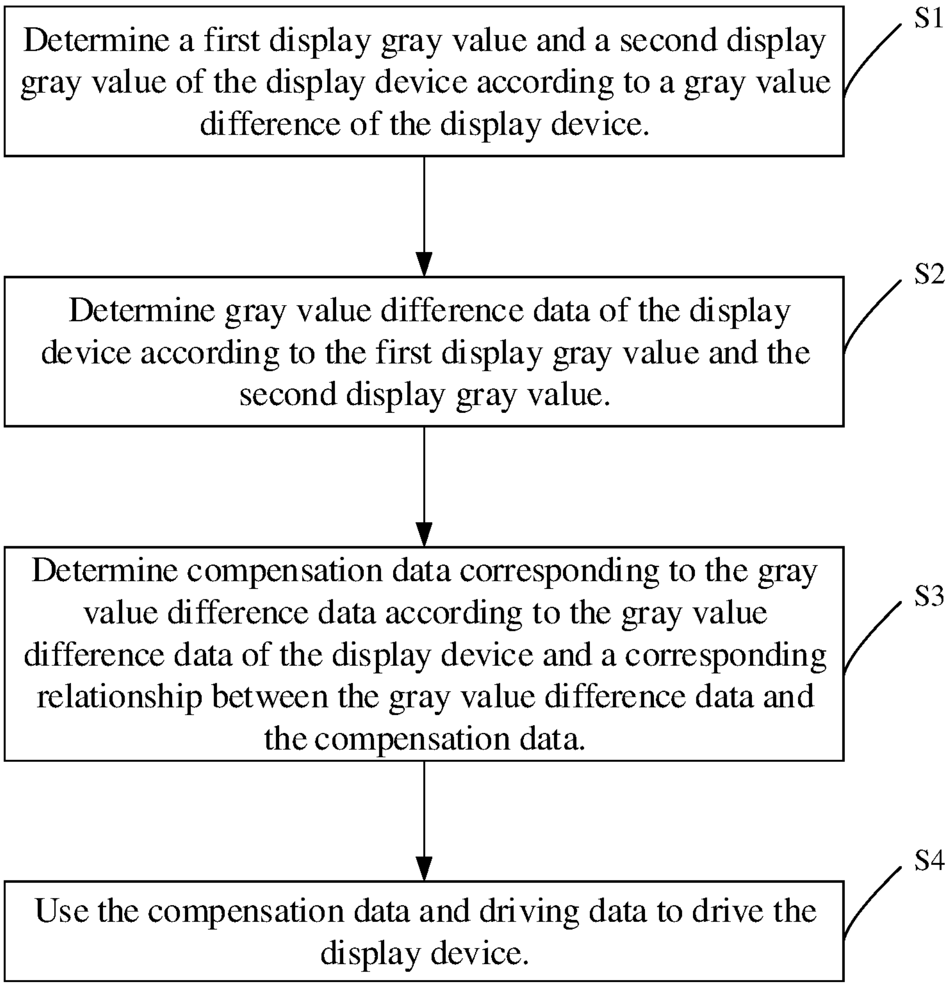
FIG. 5 is a flow chart of a display device driving method according to an embodiment of the present disclosure.

Please refer to FIG. 5. FIG. 5 is a flow chart of a display device driving method according to an embodiment of the present disclosure. As shown in FIG. 5, a display device driving method is disclosed. The method comprises:

S1: determining a first display gray value and a second display gray value of the display device according to a gray value difference of the display device, wherein a display time of an image corresponding to the second display gray value is later than a display time of an image corresponding to the first display gray value.

S2: determining gray value difference data of the display device according to the first display gray value and the second display gray value.

S3: determining compensation data corresponding to the gray value difference data according to the gray value difference data of the display device and a corresponding relationship between the gray value difference data and the compensation data.

S4: using the compensation data and driving data to drive the display device.

The present disclosure provides a method for driving a display device. The present disclosure obtains the gray value difference data of the display device when the gray value of the display device changes. So, the display device could determine the corresponding compensation data according to the gray value difference of the display device and then the compensation data and the driving data are used to drive the display device. In this way, the driving data are compensated when the display device has a variance of gray value such that the charging operation becomes sufficient to charge the display device. For example, the charging speed becomes faster to allow the display device to reach sufficient luminance such that the issues of color shifts or insufficient luminance could be avoided.

In some embodiments, the step of determining the gray value difference data of the display device according to the first display gray value and the second display gray value comprises: determining a difference between the first display gray value and the second display gray value according to the first display gray value and the second display gray value; and determining the gray value difference data according to the difference between the first display gray value and the second display gray value and a predetermined gray value.

In some embodiments, the step of determining the gray value difference data according to the difference between the first display gray value and the second display gray value and the predetermined gray value comprises: obtaining the predetermined gray value; comparing the difference between the first display gray value and the second display gray value with the predetermined gray value to determine a comparison result; and determining the gray value difference data of the display device according to the comparison result.

In some embodiments, the step of comparing the difference between the first display gray value and the second display gray value with the predetermined gray value to determine the comparison result comprises: obtaining a first reference gray value, wherein the predetermined gray value comprises the first reference gray value; determining whether the difference between the first display gray value and the second display gray value is greater than the first reference gray value; and determining the comparison result if the difference between the first display gray value and the second display gray value is greater than the first reference gray value.

In some embodiments, the method further comprises following steps after the step of determining whether the difference between the first display gray value and the second display gray value is greater than the first reference gray value: obtaining a second reference gray value if the difference between the first display gray value and the second display gray value is smaller than or equal to the first reference gray value, wherein the second reference gray value is smaller than the first reference gray value; determining whether the difference between the first display gray value and the second display gray value is greater than the second reference gray value; and determining the comparison result if the difference between the first display gray value and the second display gray value is greater than the second reference gray value.

In some embodiments, the method further comprises following steps after the step of determining whether the difference between the first display gray value and the second display gray value is greater than the second reference gray value: obtaining a third reference gray value if the difference between the first display gray value and the second display gray value is smaller than or equal to the second reference gray value, wherein the third reference gray value is smaller than the second reference gray value; determining whether the difference between the first display gray value and the second display gray value is greater than the third reference gray value; and determining the comparison result if the difference between the first display gray value and the second display gray value is greater than the third reference gray value.

In some embodiments, the method further comprises following steps after the step of determining whether the difference between the first display gray value and the second display gray value is greater than the third reference gray value: obtaining a fourth reference gray value if the difference between the first display gray value and the second display gray value is smaller than or equal to the third reference gray value, wherein the fourth reference gray value is smaller than the third reference gray value; determining whether the difference between the first display gray value and the second display gray value is greater than the fourth reference gray value; and determining the comparison result if the difference between the first display gray value and the second display gray value is greater than the fourth reference gray value.

In some embodiments, the step of comparing the difference between the first display gray value and the second display gray value with the predetermined gray value to determine the comparison result comprises: obtaining a first reference gray value, a second reference gray value, a third reference gray value and a fourth reference gray value, wherein the predetermined gray value comprises the first reference gray value, the second reference gray value, the third reference gray value and the fourth reference gray value, the first reference gray value is greater than the second reference gray value, the second reference gray value is greater than the third reference gray value, and the third reference gray value is greater than the fourth reference gray value; respectively comparing the difference between the first display gray value and the second display gray value with the first reference gray value, with the second reference gray value, with the third reference gray value and with the fourth gray value to respectively output a first comparison result, a second comparison result, a third comparison result and a fourth comparison result accordingly; and determining the comparison result according to the first comparison result, the second comparison result, the third comparison result and the fourth comparison result.

In some embodiments, the step of determining compensation data corresponding to the gray value difference data according to the gray value difference data of the display device and the corresponding relationship between the gray value difference data and the compensation data comprises: determining first compensation data corresponding to the gray value difference data according to the first comparison result and the relationship between the gray value difference data and the compensation data; determining second compensation data corresponding to the gray value difference data according to the second comparison result and the relationship between the gray value difference data and the compensation data; determining third compensation data corresponding to the gray value difference data according to the third comparison result and the relationship between the gray value difference data and the compensation data; determining fourth compensation data corresponding to the gray value difference data according to the fourth comparison result and the relationship between the gray value difference data and the compensation data; and determining the compensation data according to the first compensation data, the second compensation data, the third compensation data and the fourth compensation data.

In some embodiments, the method further comprises following steps before the step of determining compensation data corresponding to the gray value difference data according to the gray value difference data of the display device and the corresponding relationship between the gray value difference data and the compensation data: obtaining a testing screen; determining a theoretical display gray value of the testing screen according to the testing screen; driving the display device to determine an actual gray value of the testing screen; and determining the corresponding relationship between the gray value difference data and compensation data according to the actual gray value of the testing screen and the theoretical display gray value of the testing screen.

In some embodiments, the step of using the compensation data and driving data to drive the display device comprises: obtaining the driving data corresponding to the second display gray value of the display device; obtaining the compensation data corresponding to the second display gray value of the display device; driving the display device according to the driving data and the compensation data.

The present disclosure provides a display device and a driving method. The display device includes an obtaining module, a data processing module, a determining module, and a driving module. The obtaining module determines a first display gray value and a second display gray value of the display device according to a gray value difference of the display device. The data processing module determines gray value difference data of the display device according to the first display gray value and the second display gray value. The determining module determines compensation data corresponding to the gray value difference data according to the gray value difference data of the display device and a corresponding relationship between the gray value difference data and the compensation data. The driving module uses the compensation data and driving data to drive the display device. The present disclosure obtains the gray value difference data of the display device when the gray value of the display device changes. So, the display device could determine the corresponding compensation data according to the gray value difference of the display device and then the compensation data and the driving data are used to drive the display device. In this way, the driving data are compensated when the display device has a variance of gray value such that the charging operation becomes sufficient to charge the display device. For example, the charging speed becomes faster to allow the display device to reach sufficient luminance such that the issues of color shifts or insufficient luminance could be avoided.

In the above-mentioned embodiments, the description of each embodiments has its own weight, and the part that is described in a certain embodiment can be described in other embodiments.

Above are embodiments of the present disclosure, which does not limit the scope of the present disclosure. Any modifications, equivalent replacements or improvements within the spirit and principles of the embodiment described above should be covered by the protected scope of the disclosure.

What is claimed is:

1. A method for driving a display device, the method comprising:

determining a first display gray value and a second display gray value of the display device according to a gray value difference of the display device, wherein a display time of an image corresponding to the second display gray value is later than a display time of an image corresponding to the first display gray value;

determining a difference between the first display gray value and the second display gray value;

obtaining a predetermined gray value;

obtaining a first reference gray value, wherein the predetermined gray value comprises the first reference gray value;

determining whether the difference between the first display gray value and the second display gray value is greater than the first reference gray value;

obtaining a second reference gray value if the difference between the first display gray value and the second display gray value is smaller than or equal to the first reference gray value, wherein the second reference gray value is smaller than the first reference gray value;

determining whether the difference between the first display gray value and the second display gray value is greater than the second reference gray value;

determining a comparison result if the difference between the first display gray value and the second display gray value is greater than the second reference gray value;

determining the comparison result if the difference between the first display gray value and the second display gray value is greater than the first reference gray value;

determining gray value difference data according to the comparison result;

determining compensation data corresponding to the gray value difference data according to the gray value difference data of the display device and a corresponding relationship between the gray value difference data and the compensation data; and using the compensation data and driving data to drive the display device.

2. The method of claim 1, further comprising following steps after the step of determining whether the difference between the first display gray value and the second display gray value is greater than the second reference gray value:

obtaining a third reference gray value if the difference between the first display gray value and the second display gray value is smaller than or equal to the second reference gray value, wherein the third reference gray value is smaller than the second reference gray value;

determining whether the difference between the first display gray value and the second display gray value is greater than the third reference gray value; and determining the comparison result if the difference between the first display gray value and the second display gray value is greater than the third reference gray value.

3. The method of claim 2, further comprising following steps after the step of determining whether the difference between the first display gray value and the second display gray value is greater than the third reference gray value:

obtaining a fourth reference gray value if the difference between the first display gray value and the second display gray value is smaller than or equal to the third reference gray value, wherein the fourth reference gray value is smaller than the third reference gray value;

determining whether the difference between the first display gray value and the second display gray value is greater than the fourth reference gray value; and determining the comparison result if the difference between the first display gray value and the second display gray value is greater than the fourth reference gray value.

4. The method of claim 1, wherein the step of comparing the difference between the first display gray value and the second display gray value with the predetermined gray value to determine the comparison result comprises:

obtaining the first reference gray value, the second reference gray value, a third reference gray value and a fourth reference gray value, wherein the predetermined gray value comprises the first reference gray value, the second reference gray value, the third reference gray value and the fourth reference gray value, the first reference gray value is greater than the second reference gray value, the second reference gray value is greater than the third reference gray value, and the third reference gray value is greater than the fourth reference gray value;

respectively comparing the difference between the first display gray value and the second display gray value with the first reference gray value, with the second reference gray value, with the third reference gray value and with the fourth gray value to respectively output a first comparison result, a second comparison result, a third comparison result and a fourth comparison result accordingly; and determining the comparison result according to the first comparison result, the second comparison result, the third comparison result and the fourth comparison result.

5. The method of claim 4, wherein the step of determining compensation data corresponding to the gray value difference data according to the gray value difference data of the display device and the corresponding relationship between the gray value difference data and the compensation data comprises:

determining first compensation data corresponding to the gray value difference data according to the first comparison result and the relationship between the gray value difference data and the compensation data;

determining second compensation data corresponding to the gray value difference data according to the second comparison result and the relationship between the gray value difference data and the compensation data;

determining third compensation data corresponding to the gray value difference data according to the third comparison result and the relationship between the gray value difference data and the compensation data;

determining fourth compensation data corresponding to the gray value difference data according to the fourth comparison result and the relationship between the gray value difference data and the compensation data; and determining the compensation data according to the first compensation data, the second compensation data, the third compensation data and the fourth compensation data.

6. The method of claim 1, further comprising following steps before the step of determining compensation data corresponding to the gray value difference data according to the gray value difference data of the display device and the corresponding relationship between the gray value difference data and the compensation data:

obtaining a testing screen;

determining a theoretical display gray value of the testing screen according to the testing screen;

driving the display device to determine an actual gray value of the testing screen; and determining the corresponding relationship between the gray value difference data and compensation data according to the actual gray value of the testing screen and the theoretical display gray value of the testing screen.

7. The method of claim 1, wherein the step of using the compensation data and driving data to drive the display device comprising:

obtaining the driving data corresponding to the second display gray value of the display device;

obtaining the compensation data corresponding to the second display gray value of the display device;

driving the display device according to the driving data and the compensation data.

* * * * *